United States Patent
Darshan et al.

(10) Patent No.: US 9,697,796 B2
(45) Date of Patent: Jul. 4, 2017

(54) ADAPTIVE LINEAR LUMA DOMAIN VIDEO PIPELINE ARCHITECTURE

(71) Applicant: Intel Corporation, Santa Clara, CA (US)

(72) Inventors: Nir Darshan, Alphey-Menashe (IL); Gilad Michael, Tzur Yizhak (IL); German Voronov, Holon (IL)

(73) Assignee: Intel Corporation, Santa Clara, CA (US)

( * ) Notice: Subject to any disclaimer, the term of this patent is extended or adjusted under 35 U.S.C. 154(b) by 60 days.

(21) Appl. No.: 14/669,269

(22) Filed: Mar. 26, 2015

(65) Prior Publication Data

US 2016/0284314 A1    Sep. 29, 2016

(51) Int. Cl.
  *G09G 5/02* (2006.01)
  *H04N 1/46* (2006.01)
  *G06T 3/40* (2006.01)
  *G09G 5/393* (2006.01)

(52) U.S. Cl.
  CPC .............. *G09G 5/028* (2013.01); *G06T 3/40* (2013.01); *G09G 5/393* (2013.01); *H04N 1/465* (2013.01); *G09G 2300/0452* (2013.01); *G09G 2320/0242* (2013.01); *G09G 2360/08* (2013.01); *G09G 2360/127* (2013.01); *G09G 2360/18* (2013.01)

(58) Field of Classification Search
  None
  See application file for complete search history.

(56) References Cited

U.S. PATENT DOCUMENTS

| | | | |
|---|---|---|---|
| 2005/0063586 A1* | 3/2005 | Munsil | H04N 1/4053 382/162 |
| 2006/0066926 A1* | 3/2006 | Kwak | G09G 3/2003 358/518 |
| 2006/0290957 A1 | 12/2006 | Kim et al. | |
| 2012/0050563 A1 | 3/2012 | Cote et al. | |
| 2012/0081385 A1* | 4/2012 | Cote | H04N 5/23219 345/589 |
| 2013/0163666 A1 | 6/2013 | Leontaris et al. | |
| 2013/0322746 A1* | 12/2013 | Cote | G06T 1/20 382/163 |
| 2014/0152687 A1 | 6/2014 | Liu et al. | |
| 2015/0296193 A1* | 10/2015 | Cote | H04N 9/646 382/167 |

OTHER PUBLICATIONS

International Search Report and Written Opinion for International Patent Application No. PCT/US2016/018288, mailed Jul. 8, 2016.
Office Action and Search Report mailed Dec. 27, 2016, for Taiwan Patent Application No. 105105327.

* cited by examiner

*Primary Examiner* — Xiao Wu
*Assistant Examiner* — Yu Chen
(74) *Attorney, Agent, or Firm* — Green, Howard & Mughal, LLP

(57) ABSTRACT

Techniques related to generating downscaled image or image frame data in a luma chroma separated color space for an image or video pipeline architecture are discussed. Such techniques may include converting input image data to the luma chroma separated color space based on adaptive color coefficients determined based on an illumination indicator associated with the input image data and storing downscaled color converted image data to an input image buffer of the image or video pipeline.

23 Claims, 7 Drawing Sheets

400

Determine Adaptive Color Conversion Coefficients for an Input Image Data based on an Illumination Indicator associated with the Input Image Data
401

Convert the Input Image Data to Color Converted Image Data in a Luma Chroma Separated Color Space based on the Adaptive Color Conversion Coefficients
402

Store Downscaled Color Converted Image Data associated with the Color Converted Image Data to an Input Image Buffer
403

FIG. 4

ADAPTIVE LINEAR LUMA DOMAIN VIDEO PIPELINE ARCHITECTURE

BACKGROUND

For devices that capture video, a frame rate of video capture such as 30, 60, or 120 frames per second may be required. Such frame rate video capture may require the device to provide a high computational load and use large amounts of power. Furthermore, much of the video and image processing performed by the device may require lower resolution images than captured by the image sensor of the device. In some implementations, image signal processor (ISP) architectures may provide for downscaling the capture images or video frames early in the image processing pipeline and before the image data is stored in the main image memory (e.g., dynamic random access memory or DRAM) of the device. Such early downscaling may save memory, memory access bandwidth, and unnecessary computational loads for the rest of the processing chain or pipeline.

In some examples, the captured image from the image sensor of the device may be in a Bayer pattern, a similar red-green-blue (RGB) pattern, a red-green-blue-white (RGBW) pattern, or the like. The captured image may then be demosaiced to generate missing colors (e.g., interpolation or the like may be performed to generate a full color image from the incomplete color samples from the image sensor), downscaled, remosaiced (e.g., punctuated to form a Bayer or similar pattern image), and saved to main image memory or the like. Such processing may provide a lower resolution (and lower memory usage) image for processing via the image processing pipeline saving on memory usage, memory load, computational requirements, and cost of implementation. However, such processing may affect the image quality (IQ) of the captured images or frames dramatically in terms of resolution, interpolation artifacts, aliasing, and the like.

It may be advantageous to provide low computational complexity, low memory usage, and low power image processing that maintains higher image quality. It is with respect to these and other considerations that the present improvements have been needed. Such improvements may become critical as the desire to provide high quality video becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 4 is a flow diagram illustrating an example process for generating downscaled image data;

DETAILED DESCRIPTION

Figure 1:
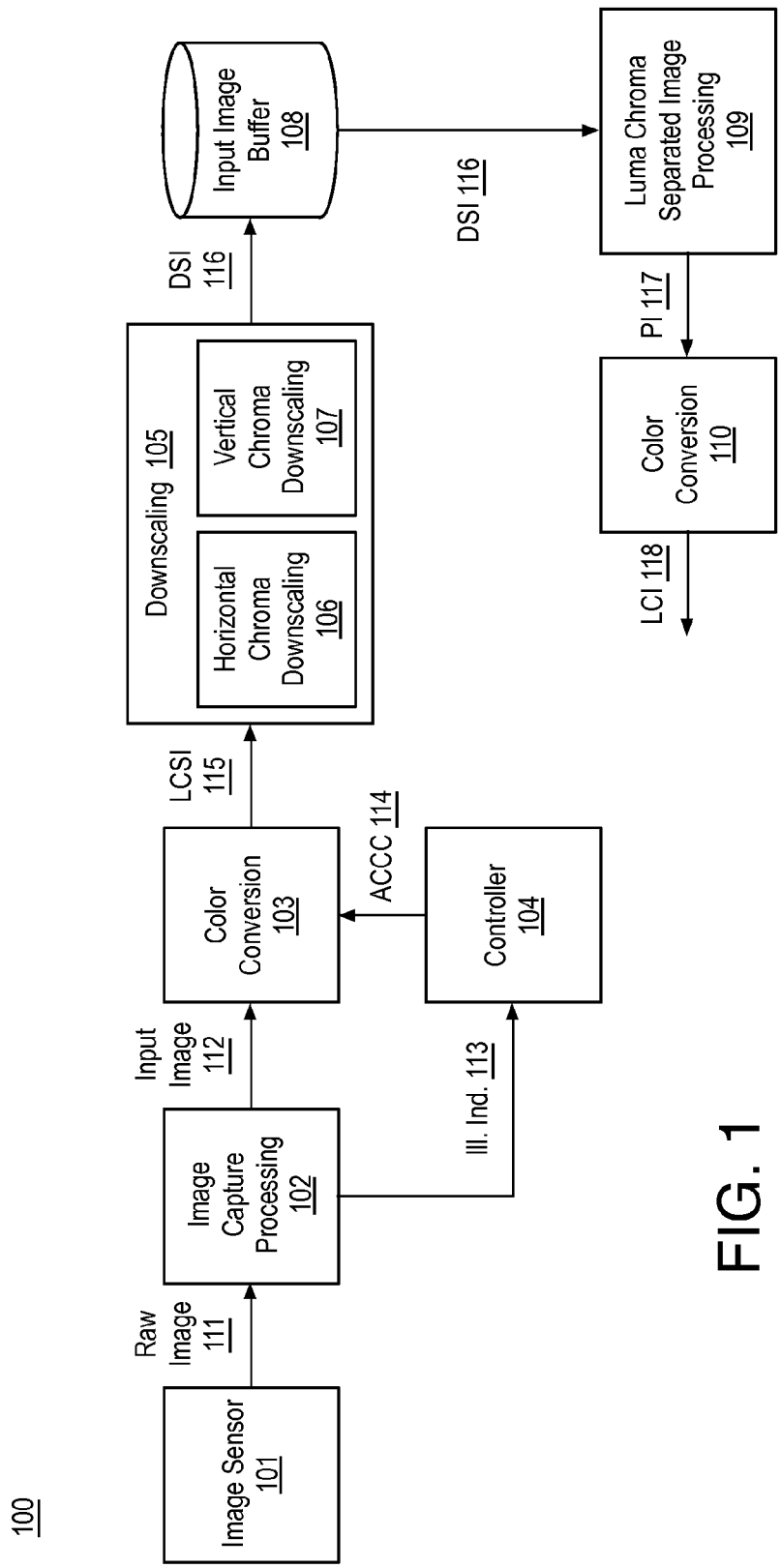
FIG. 1 illustrates an example device for generating downscaled image data.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to video pipeline architectures and, in particular, to generating downscaled image data in a chroma luma separated color space based on a color conversion using adaptive color conversion coefficients.

As described above, in video pipeline architectures such as image signal processor architectures, captured images or video frames may be demosaiced from a Bayer pattern or the like, downscaled, remosaiced and stored in a main image memory such as an input buffer, input image buffer, or the like. Such techniques may adversely affect image quality in terms of resolution, interpolation artifacts, aliasing, and the like. Techniques discussed herein may provide a video pipeline architecture that saves computational resources, memory transactions, and chip area (and therefore cost) in implementation while also providing improved image quality. Such techniques may be provided for images (e.g., image data associated with still images) and/or video images or frames (e.g., image data associated with video frames of a video sequence). As used herein, the term image data or similar terms may be indicative of or associated with image data for still images or video frames.

In some embodiments, input image data such as image data from an image sensor or image data from an image sensor that has undergone preprocessing may be received. The input image data may be in a color space such as the red-green-blue (RGB) color space or the red-green-blue-white (RGBW) or the like. For example, such input image data may include raw image data from an image sensor in a Bayer pattern or similar pattern that has been demosaiced to generate the input image data. Adaptive color conversion coefficients associated with input image data may be determined. For example, the adaptive color conversion coefficients may be adaptive based on a characteristic of the input image data such as an illumination indicator associated with the input image data. The illumination indicator may be a white balance parameter, a scene type parameter, or the like. Based on the adaptive color conversion coefficients, the input image data may be converted to color converted image data in a luma chroma separated color space. For example, as used herein, the term luma chroma separated color space may include any color space where luma and chroma components are substantially separated such as the YUV color space or the like.

The luma chroma separated color space image data may be downscaled and stored in a main image memory such as an input image buffer or the like. The stored luma chroma separated color space image data may be processed via a pipeline (e.g., an image or video processing pipeline) using any suitable technique or techniques such as denoising, sharpening, chromatic alteration, or the like. Furthermore, such processed image data in the luma chroma separated color space may subsequently be color converted to another color space such as a linear RGB color space or the like for further processing such as color correction, gamma correction, or the like. For example, such linear RGB color space data may be converted to a standard color space such as the sRGB color space or the like. Such processing may provide advantages such as a lower footprint for the image data in the input image buffer (saving memory transactions and memory lines), improved image quality (e.g., with fewer artifacts), and the like. Furthermore, such a pipeline architecture may be expanded to accommodate multiple image sensors (e.g., from front and back device cameras or the like) such that only the image sensor and optional image capture processing modules may be duplicated (e.g., other modules may be shared across the multiple image sensors).

The techniques discussed herein may provide luma chroma separated color space image data to subsequent image or video pipeline processing without remosaicing operations. Such techniques may provide high image quality at a low cost in terms of input image buffer (e.g., DRAM) bandwidth. For example, input image data may be linearly transformed from a linear RGB domain (e.g., 3 channels) associated with an image sensor to a luma chroma separated color domain. For example, the linear transform may be adaptive based on the illumination of the input image data. Furthermore, the chroma channels of the luma chroma separated color space image data may be downscaled (e.g., by 2 in both the horizontal and vertical axes to a 4:2:0 format) and stored in an image buffer for further processing.

FIG. 1 illustrates an example device 100 for generating downscaled image data, arranged in accordance with at least some implementations of the present disclosure. As shown in FIG. 1, device 100 may include an image sensor 101, an image capture processing module 102, a color conversion module 103, a controller module 104, a downscaling module 105, an input image buffer 108, a luma chroma separated image processing module 109, and a color conversion module 110. Furthermore, downscaling module 105 may include horizontal chroma downscaling module 106 and vertical chroma downscaling module 107. Device 100 may be any suitable form factor device. For example, device 100 may be a computer, a laptop computer, a tablet, a smart phone, a phablet, digital camera, a display device, a gaming device, a wearable device such as a smart watch, smart glasses, or the like. For example, device 100 may implement an image or video pipeline to generate downscaled image data and provide image processing as discussed herein.

As shown, image sensor 101 may generate raw image data 111. For example, image sensor 101 as implemented via a camera module or optics or the like may be exposed to a scene and image sensor 101 may generate raw image data 111 representative of the scene. Image sensor 101 may include any suitable image sensor. Furthermore, raw image data 111 may include image data in any suitable format. In some examples, raw image data 111 may be characterized as image sensor data, captured image data, or the like. In some examples, raw image data 111 may include image data in a format representative of a Bayer pattern or other similar pattern. For example, image sensor 101 may have a color filter array (CFA) overlaying the sensor. In some examples, the CFA may be in a standard Bayer pattern having a lattice in an RGB quad with a size of 2×2 pixels with G appearing twice (e.g., 50% green, 25% red, 25% blue). In other examples, raw image data 111 may be in a lattice up to 4×4 pixels with any order RGBC (e.g., red, green, blue and any color). For example, raw image data 111 may include, for each pixel of raw image data 111 a pixel value corresponding to the color filter associated with the pixel. For example, raw image data 111 may include a red, green, or blue value for each pixel position in some implementations (e.g., RGB examples) and raw image data 111 may include a red, green, blue, or any other value for each pixel position in some implementations (e.g., RGBC examples). For example, raw image data 111 may include RGBC image data where C may refer to any other color (e.g., white (W) or luma (Y) or the like). Although discussed herein with respect to RGB and RGBW color spaces in some implementations, raw image data 111 may be in any suitable color space. Image sensor 101 may provide raw image data 111 to image capture processing module 102 and/or a memory (not shown) of device 100.

Image capture processing module 102 may receive raw image data 111 from image sensor 101 or memory and image capture processing module 102 may generate input image data 112 and/or illumination indicator (ill. ind.) 113. Image capture processing module 102 may generate input image data 112 using any suitable technique or techniques. For example, image capture processing module 102 may perform demosaicing (e.g., color filter array reconstruction) to generate a full color image based on raw image data 111. For example, such demosaicing may determine 3 color values (e.g., 3 color channels) for each pixel position of raw image data 111. For example, assuming a particular pixel position is a red pixel position (e.g., has an associated red color filter), the 3 color channels for the pixel position may include: the associated red value sensed at the pixel position, an approximated or reconstructed green value, and an approximated or reconstructed blue value. Using such techniques, 3 color values may be determined for each pixel location to generate a full color image.

Furthermore, image capture processing module 102 may perform additional processing associated with image capture and/or image preprocessing such as pixel formatting, normalization, linearization, optical black balance or correction, shading correction, pixel defect correction (e.g., correcting failed and/or outlier pixel values), white balance correction, scaling, or the like. Furthermore, input image data 112 may include any suitable image data in any suitable color space. For example, input image data 112 may be in the RGB color space or the RGBW color space or the like. In some examples, input image data 112 may be in linear RGB or linear RGBW color spaces. However, as discussed, input image data 112 may be in any suitable color space. Furthermore, input image data 112 may be characterized as input image data as it is input to color conversion module 103 for color conversion to a luma chroma separated color space. However, in other examples, input image data 112 may be characterized as image data, raw image data, preprocessed image data, or the like. Also, input image data 112 may be associated with a still image or an image frame of a video sequence. For example, in some implementations, input image data 112 may be characterized as an image frame, a frame, a frame of a video sequence, or the like. Image capture processing module 102 may provide input image data 112 to color conversion module 103 and/or a memory of device 100.

Also as shown, image capture processing module 102 may generate illumination indicator 113 associated with input image data 112. Illumination indicator 113 may include any suitable indicator or data or the like representative of the illumination of input image data 112. In some examples, illumination indicator 113 may include one or more white balance parameters. For example, the white balance parameter(s) may include parameter(s) or coefficient(s) for performing color balance with respect to input image data 112. In other examples, illumination indicator 113 may include an indicator (e.g., a value or a parameter) such as a scene type parameter indicative of an illumination of the scene. Such a scene type parameter may include or indicate a scene type such as bright, dim, indoor, outdoor, fluorescent lighting, or the like. As shown, in some examples, image capture processing module 102 may generate illumination indicator 113. Image capture processing module 102 may generate illumination indicator 113 using any suitable technique or techniques. In other examples, illumination indicator 113 may be received as or may be based on an input to device 100 (e.g., via a user selecting an image capture mode based on a scene environment) or illumination indicator 113 may be generated via another module of device 100 such as a white balance module or the like. Image capture processing module 102 may provide illumination indicator 113 to controller module 104 and/or a memory of device 100.

Controller module 104 may receive illumination indicator 113 and controller module 104 may determine adaptive color conversion coefficients (ACCC) 114. For example, adaptive color conversion coefficients 114 may be determined based on illumination indicator 113. Controller module 104 may determine adaptive color conversion coefficients 114 using any suitable technique or techniques. For example, sets of adaptive color conversion coefficients may be predetermined in a training phase or calibration phase and provided to a memory of device 100. Such sets of adaptive color conversion coefficients may be accessed via a look up table or multiple look up tables based on illumination indictor 113 (e.g., illumination indicator 113 may include one or more values for indexing one or more look up tables) and adaptive color conversion coefficients 114 may be determined based on such access and/or interpolation techniques.

For example, two or more closest (e.g., based on illumination indicator 113 and associated look up table indexes) sets of adaptive color conversion coefficients may be accessed based on illumination indicator 113 and adaptive color conversion coefficients 114 may be determined based on an interpolation or the like based on the two or more closest set of adaptive color conversion coefficients. In other examples, adaptive color conversion coefficients 114 may be determined based on a single access such that the closest set of adaptive color conversion coefficients are used as adaptive color conversion coefficients 114. Furthermore, although discussed with respect to look up table techniques, adaptive color conversion coefficients 114 may be determined using any suitable techniques.

Adaptive color conversion coefficients 114 may include any suitable number of coefficients. For example, as discussed herein, input image data 112 may include 3 or 4 channels (e.g., the RGB color space having 3 color channels or the RGBW color space having 4 color channels) or the like. Furthermore, luma chroma separated image data 115 may include 3 channels or the like (e.g., a luma channel and two chroma channels). In examples where input image data 112 has 3 channels and luma chroma separated image data 115 has 3 channels, adaptive color conversion coefficients 114 may include 9 coefficients in a 3×3 matrix. In examples where input image data 112 has 4 channels and luma chroma separated image data 115 has 3 channels, adaptive color conversion coefficients 114 may include 9 coefficients in a 4×3 matrix. For example, adaptive color conversion coefficients 114 may include N×M coefficients where N is the number of color channels of input image data 112 and M is the number of luma chroma separated image data 115.

Controller module 104 may be implemented using any suitable technique or techniques. For example, controller module 104 may be implemented in hardware or software or a combination thereof. In some examples, controller module 104 may be implemented via a driver such as an adaptive color conversion coefficients driver or the like. Furthermore, controller module 104 may be characterized as a controller, a color conversion controller, a driver, a color conversion driver, or the like. Controller module 104 may provide adaptive color conversion coefficients 114 to color conversion module 103 and/or a memory of device 100.

Color conversion module 103 may receive input image data 112 from image capture processing module 102 or memory and adaptive color conversion coefficients 114 from controller module 104 or memory. Color conversion module 103 may generate luma chroma separated image data 115 based on input image data 112 and adaptive color conversion coefficients 114. For example, color conversion module 103 may perform a linear transform on input image data 112 based on adaptive color conversion coefficients 114. For example a coefficient matrix as provided by adaptive color conversion coefficients 114 may be applied to the RGB or RGBW or the like image signal associated with input image data to generate luma chroma separated image data 115. Luma chroma separated image data 115 may include any suitable image data such as a luma channel and two chroma channel (e.g., each pixel position of luma chroma separated image data 115 having 3 values: one for luma and two for chroma). For example, the luma chroma color space associated with luma chroma separated image data 115 may be defined and/or calibrated via a training or calibration phase. In some examples, the luma chroma color space may be characterized as a linear luma domain or the like. Furthermore, the luma chroma separated color space may be associated with color conversion parameters or coefficients that may be used to convert image data from the luma chroma separated color space to a standard color space such as sRGB, which may provide for device 100 to communicate with other devices based on the common color space or domain. Color conversion module 103 may provide luma chroma separated image data 115 to downscaling module 105 and/or a memory of device 100.

Downscaling module 105 may receive luma chroma separated image data 115 from downscaling module 105 or a memory of device 100 and downscaling module 105 may generate downscaled image data (DSI) 116. Downscaling module 105 may generate downscaled image data 116 using any suitable technique or techniques. For example, horizontal chroma downscaling module 106 of downscaling module 105 may downscale in the chroma channels of luma chroma separated image data 115 in horizontal direction or axis and vertical chroma downscaling module 107 of downscaling module 105 may downscale the chroma channels of luma chroma separated image data 115 in the vertical direction or axis. For example, one or both of horizontal chroma downscaling module 106 and vertical chroma downscaling module 107 may apply a finite impulse response (FIR) filter and decimation to luma chroma separated image data 115. Furthermore, the luma channel of luma chroma separated image data 115 may not be downscaled in some examples.

As shown, in some examples, both horizontal and vertical chroma downscaling may be applied with horizontal chroma downscaling being applied first. For example, the chroma channels of luma chroma separated image data 115 may be downscaled by a factor of two in both the horizontal and vertical direction to generate 4:2:0 formatted image data. However, luma chroma separated image data 115 may be downscaled using any suitable technique or techniques into any suitable format. In some examples, only horizontal chroma downscaling may applied and, in other examples, only vertical chroma downscaling may applied. In other examples, vertical chroma downsampling may be applied before horizontal chroma downsampling. Furthermore, in some examples, the downsampling factor may be different in the horizontal and vertical directions. As discussed, in some examples, downscaled image data 116 may be in the 4:2:0 format. In other examples, downscaled image data 116 may be in any of the 4:2:2 format, 4:2:1 format, 4:1:1 format, 4:0:0 format, or the like. As discussed, downscaled image data 116 may include downscaled luma chroma separated image data. As shown, downscaling module 105 may provide downscaled image data 116 to input image buffer 108.

Input image buffer 108 may store downscaled image data 116 and may make downscaled image data 116 available to other portions of the image or video pipeline implemented via device 100. For example, downscaled image data 116 may offer a reduced memory footprint as compared to input image data 112 for further processing saving memory lines, memory transactions, chip size, power, and the like. Furthermore, the discussed processing techniques may provide downscaled image data 116 having high image quality (IQ) in terms of resolution, interpolation artifacts, aliasing, and the like.

As shown, luma chroma separated image processing module 109 may retrieve downscaled image data 116 (e.g., image data in the luma chroma separated color space) and luma chroma separated image processing module 109 may generate processed image data 117. Luma chroma separated image processing module 109 may perform any suitable image processing based on downscaled image data 116. For example, luma chroma separated image processing module 109 may perform image processing that may be advantageously performed on image data in a perceptual color space. For example, luma chroma separated image processing module 109 may perform denoising, sharpening, chromatic alteration (e.g., chromatic distortion), or the like. Processed image data 117 may include any suitable image data such as image data in the same format as downscaled image data 116 (e.g., downscaled luma chroma separated image data). Luma chroma separated image processing module 109 may provide processed image data 117 to color conversion module 110 and/or a memory of device 100.

Color conversion module 110 may receive processed image data 117 (e.g., image data in the luma chroma separated color space) and color conversion module 109 may generate linear color space image (LCI) data 118. For example, color conversion module 110 may convert processed image data to a color space such as a linear color space for further processing. For example, linear color space image data may be in the RGB or RGBW color space or the like. Furthermore, device 100 may further process linear color space image data 118 using any suitable technique or techniques via an image or video pipeline or the like. For example, device 100 may perform further processing that may be advantageously performed on image data in a linear color space. For example, such processing may include color correction, gamma correction, or the like. Such processed image data may be further processed and/or used by device 100 for a variety of applications. For example, the processed data may be converted to a standard color space such as sRGB for transmission to another device (e.g., via video encoding or video conferencing techniques or the like), for display via device 100 or an external display device, or the like.

As discussed, device 100 may implement an image and/or video pipeline. For example, one or more of modules 102-110 and/or additional modules may be a part of an image processing pipeline. In some examples, input image buffer 108 may be a junction point or the like in the pipeline such that processing prior to input image buffer 108 may be considered front end image processing. In some examples, such front end processing may be performed on image data associated with an entire image. Furthermore, processing subsequent to input image buffer 108 may be considered back end procession. In some examples, such back end processing may be performed on image data associated with slices of an image (e.g., on a slice basis or the like).

Furthermore, device 100 as illustrated may include a single camera and associated image sensor 101. However, as discussed, in other examples, a device may include multiple cameras and associated image sensors. In such examples, portions of the described image processing pipeline may be shared among the multiple cameras to save implementation cost and complexity.

Figure 2:
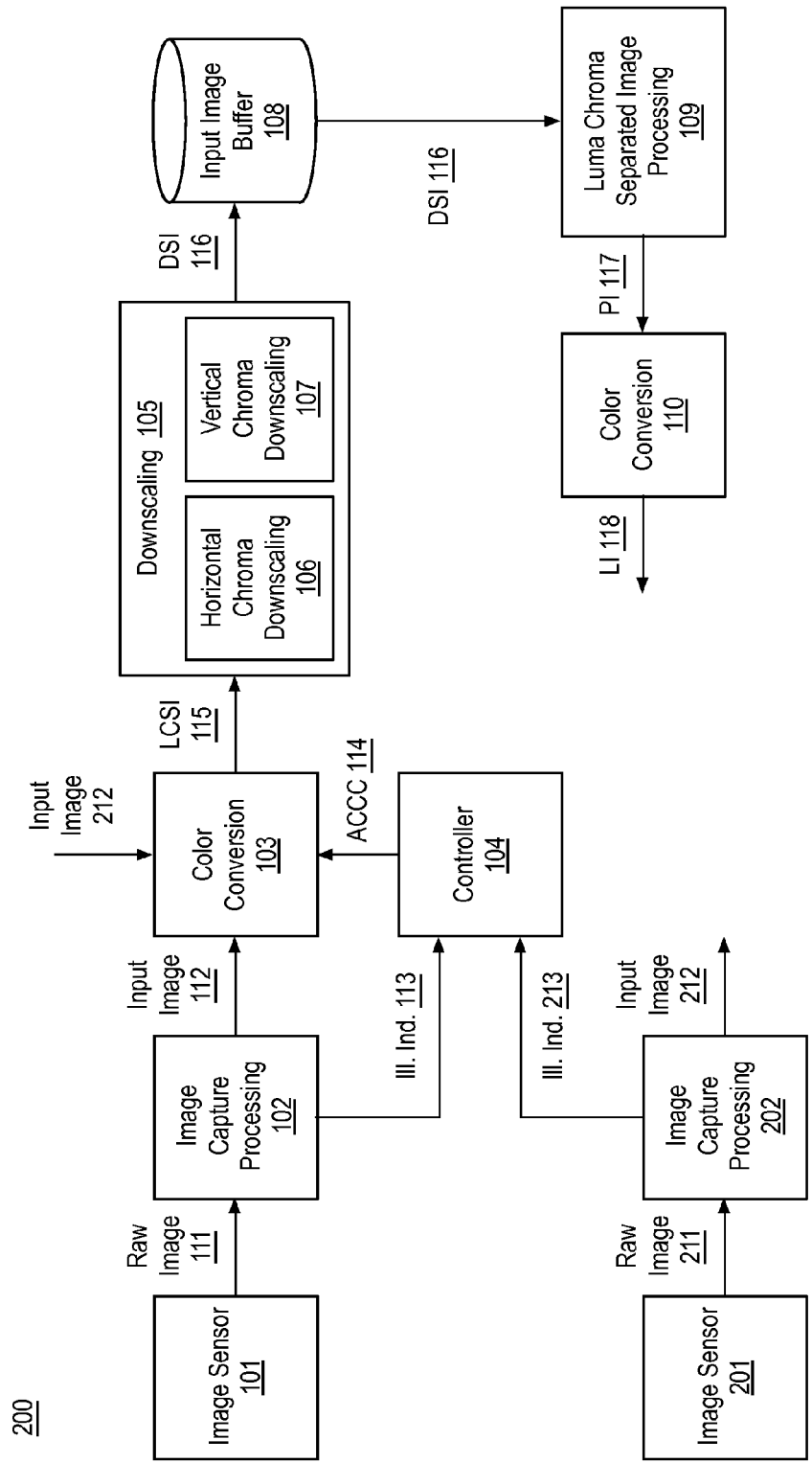
FIG. 2 illustrates an example device for generating downscaled image data from multiple image sensors.

FIG. 2 illustrates an example device for generating downscaled image data from multiple image sensors, arranged in accordance with at least some implementations of the present disclosure. As shown in FIG. 2, device 200 may include image sensor 101, image capture processing module 102, color conversion module 103, controller module 104, downscaling module 105, input image buffer 108, luma chroma separated image processing module 109, and color conversion module 109. The operation of such modules has been discussed with respect to FIG. 1 and will not be repeated for the sake of clarity of presentation. As also shown in FIG. 2, device 200 may include an image sensor 201 and an image capture processing module 202. Device 200 may be any device as discussed with respect to device 100 or elsewhere herein such as a computer, a laptop computer, a tablet, a smart phone, a phablet, digital camera, a display device, a gaming device, a wearable device such as a smart watch, or the like.

As shown, image sensor 201 may generate raw image data 211. For example, image sensor 101 may be may be implemented via a first camera module (e.g., a front facing camera) and image sensor 201 may be implemented via a second camera module (e.g., a back facing camera) of device 200. Image sensor 201 may include any suitable image sensor and raw image data 211 may include image data in any suitable format such as those discussed with respect to raw image data 111. Image sensor 201 may provide raw image data 211 to image capture processing module 202 and/or a memory (not shown) of device 200.

Image capture processing module 202 may receive raw image data 211 from image sensor 201 or memory and image capture processing module 202 may generate input image data 212 and/or illumination indicator (ill. ind.) 213. Image capture processing module 202 may generate input image data 112 and illumination indicator 213 using any suitable technique or techniques such as those discussed with respect to device 100. For example, image capture processing module 202 may perform demosaicing (e.g., color filter array reconstruction) to generate a full color image based on raw image data 211 and/or additional processing associated with image capture and/or image preprocessing such as pixel formatting, normalization, linearization, optical black balance or correction, shading correction, pixel defect correction (e.g., correcting failed and/or outlier pixel values), white balance correction, scaling, or the like. Input image data 212 may include any suitable image data in any suitable color space such as those discussed with respect to input image data 112. Image capture processing module 202 may provide input image data 212 to color conversion module 103 and/or a memory of device 100. Furthermore, illumination indicator 213 may include any suitable indicator or data or the like representative of the illumination of input image data 212 such as the indicators or parameters or the like discussed with respect to illumination indicator 113 including, for example, white balance parameter(s), a scene type parameter, or the like. As shown, image capture processing module 202 may provide illumination indicator 213 to controller module 104 and/or a memory of device 100.

Controller module 104 may receive illumination indicator 213 and controller module 104 may determine adaptive color conversion coefficients 114 based on illumination indicator 213 as discussed with respect to device 100. Furthermore, color conversion module 103 may receive input image data 212 and adaptive color conversion coefficients 114 and color conversion module 103 may generate luma chroma separated image data 115 as discussed with respect to device 100. For example, depending on which image sensor of image sensors 101, 201 is active, preprocessing may be performed by image capture processing module 102 or image capture processing module 202 to generate an input to controller module 104 (e.g., either illumination indicator 113 or illumination indicator 213) and an input to color conversion module 103 (e.g., either input image date 112 or input image data 212). Based on such inputs, further processing (e.g., determination of adaptive color conversion coefficients 114, generation of luma chroma separated image data 115, downscaling to downscaled image data 116, storage into input image buffer 108, and any subsequent processing) may be performed.

For example, device 200 may provide an image or video pipeline architecture to save repeated module implementation. For example, repetition of controller module 104, color conversion module 103, downscaling module 105, input image buffer 108, luma chroma separated image processing module 109, color conversion module 110, and any subsequent processing modules in the pipeline. In the illustrated example, image capture processing module 102 and image capture processing module 202 may be repeated as those modules may be closely associated with image sensor 101 and image sensor 201, respectively. However, in other examples, a single image capture processing module may be provided. For example, image capture processing module 202 may be illuminated and raw image data 211 may be provided from image sensor 201 to image capture processing module 102 in such examples.

The image or video pipeline architecture discussed with respect to FIGS. 1 and 2 may provide for substantial memory savings with respect to input image buffer 108 along with high image quality (IQ). For example, the discussed image or video pipeline architecture may eliminate remosaicing operations prior to storing image data to the input image buffer and may provide for image data in a perception color space (e.g., the luma chroma separated color space) for processing. Such an architecture may provide for image processing techniques that maintain high IQ with relatively low usage of memory bandwidth, which may save on implementation cost and power consumption.

Figure 3:
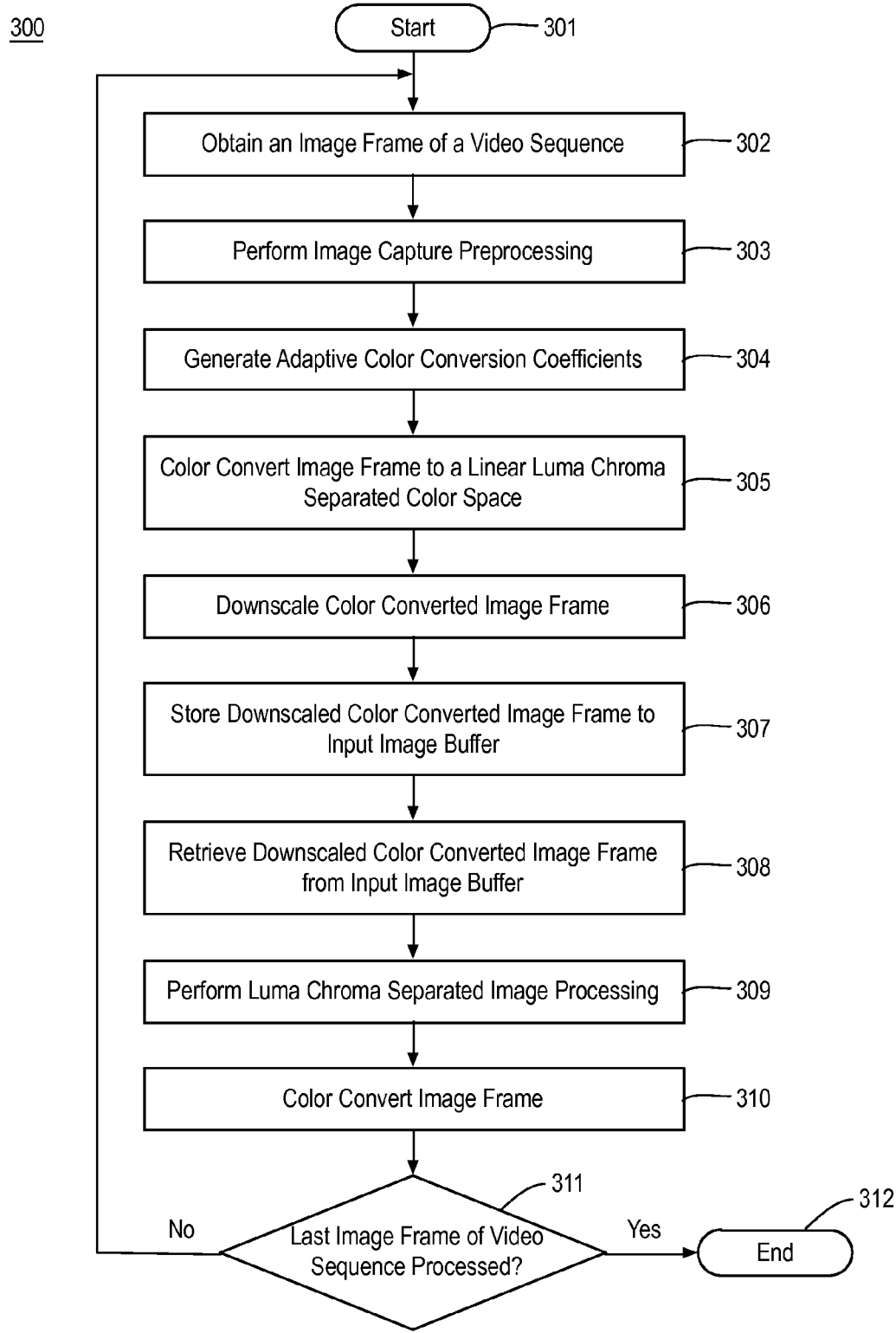
FIG. 3 illustrates an example process for generating downscaled image data for a video sequence.

FIG. 3 illustrates an example process 300 for generating downscaled image data for a video sequence, arranged in accordance with at least some implementations of the present disclosure. Process 300 may include one or more operations 301-312 as illustrated in FIG. 3. Process 300 may be performed by a device (e.g., device 100, device 200 or any other device or system discussed herein) or portions of process 300 may be performed by a device to generate downscaled image data for a video sequence. Process 300 or portions thereof may be repeated for any number images, image frames, video sequences, portions thereof, or the like.

As shown, process 300 may begin from start operation 301 at operation 302, "Obtain an Image Frame of a Video Sequence", where an image frame of a video sequence may be obtained. The image frame may be obtained using any suitable technique or techniques. For example, the image frame or video frame or frame or the like may be obtained via an image sensor such as image sensor 101 or image sensor 201 or the like. The image frame may include image data such as raw image data having any suitable format such as image data having a Bayer pattern or similar pattern as discussed herein.

Processing may continue at operation 303, "Perform Image Capture Preprocessing", where image capture preprocessing may be performed on the raw image data obtained at operation 302. The image capture preprocessing may include any suitable image processing. For example, the image preprocessing may include demosaicing to generate a full color image and/or additional processing associated with image capture and/or image preprocessing such as pixel formatting, normalization, linearization, optical black balance or correction, shading correction, pixel defect correction (e.g., correcting failed and/or outlier pixel values), white balance correction, scaling, or the like. For example, image data generated via operation 303 may include full color image data in a color space such as RGB or RGBW or the like.

Processing may continue at operation 304, "Generate Adaptive Color Conversion Coefficients", where adaptive color conversion coefficients may be determined based on the input image. The adaptive color conversion coefficients may be determined using any suitable technique or techniques. For example, the adaptive color conversion coefficients may be determined based on an illumination indicator associated with the input image. In some examples, a look up table (or multiple look up tables) may be accessed based on the illumination indicator, which may include one or more parameters or the like. The look up table or tables may be indexed by the illumination indicator and may provide one or more closest adaptive color conversion coefficients or sets of adaptive color conversion coefficients. For example, the closest adaptive color conversion coefficients or sets of adaptive color conversion coefficients may be those associated with a look up table index value or values that are closest to the illumination indicator. If a single set of adaptive color conversion coefficients is provided via the look up table access, those adaptive color conversion coefficients may be provided via operation 304. In examples where two or more sets of adaptive color conversion coefficients are provided via the look up table access, the adaptive color conversion coefficients provided via operation 304 may be determined based on the two or more sets of adaptive color conversion coefficients based on an interpolation technique or the like.

Processing may continue at operation 305, "Color Convert Image Frame to a Linear Luma Chroma Separated Color Space", where the image frame may be converted to a linear luma chroma separated color space. For example the image data representative of or associated with the image frame may be converted based on the adaptive color conversion coefficients generated at operation 304 via a linear conversion operation or the like. As discussed, the luma chroma separated color space may be any suitable color space that separates luma and chroma channels (e.g., into a single luma channel and two or more chroma channels) and the luma chroma separated color space may be defined in a training or calibration phase or the like. For example, the luma chroma separated color space may be similar to or characterized as a YUV color space or the like. The image data generated via operation 305 may include any suitable image data such as channel values (e.g., 3 channels) for each pixel location of the image frame.

Processing may continue at operation 306, "Downscale Color Converted Image Frame", where the color converted image frame may be downscaled. The color converted image frame may be downscaled using any suitable technique or techniques. In some examples, the color channels of the color converted image frame may be downscaled by a factor of 2 in the horizontal and vertical directions to generate an image or image data in the 4:2:0 format. For example, the horizontal and vertical downscaling may include the application of a finite impulse response (FIR) filter and decimation operation to the color channels of the color converted image frame.

Processing may continue at operation 307, "Store Downscaled Color Converted Image Frame to Input Image Buffer", where the downscaled color converted image frame or image data may be stored to an input image buffer. For example, the downscaled color converted image frame or image data may provide reduced storage requirements (after downscaling) and high image quality (IQ). The input image buffer may be characterized as a main image memory, an image buffer, or the like and the input image buffer may be implemented via DRAM. For example, the input image buffer may provide the downscaled color converted image frame or image data for retrieval by other modules of the image or video pipeline for continued image processing.

Processing may continue at operation 308, "Retrieve Downscaled Color Converted Image Frame from Input Image Buffer", where the downscaled color converted image frame or image data may be retrieved. For example, the downscaled color converted image frame or image data may be retrieved via any module of a video or image pipeline for further processing. For example, as discussed herein with respect to FIGS. 1 and 2 and operation 309, downscaled color converted image frame or image data may be accessed by a luma chroma separated image processing module or the like. However, downscaled color converted image frame or image data may be accessed or retrieved by any suitable image processing module for any suitable image or video processing such as object detection or recognition, computer vision, image enhancement, image encoding, video encoding, or the like.

Processing may continue at operation 309, "Perform Luma Chroma Separated Image Processing", where luma chroma separated image processing may be performed based on the retrieved downscaled color converted image frame or image data. Such image processing may including any suitable image processing and, in particular, image processing that may be advantageously performed in a perceptual color domain. For example, the luma chroma separated image processing performed at operation 309 may include denoising, sharpening, chromatic alteration (e.g., chromatic distortion), or the like. For example, a processed image frame or image data in the luma chroma separated color space may be generated via operation 309.

Processing may continue at operation 310, "Color Convert Image Frame", where the processed image frame or image data in the luma chroma separated color space may be color converted to a color space such as a RGB color space or a RGBW color space or the like. For example, the processed image frame or image data may be converted from a linear luma chroma separated color space to a linear color space such as a linear RGB color space or a linear RGBW color space or the like. For example, the image frame or image data converted to such a color space (e.g., linear color space) may be further processed via operations that may be advantageously performed in a linear color space such as color correction, gamma correction, or the like. Furthermore, the image frame or image data converted to such a linear color space may be converted to a standard color space such as sRGB or the like for transmission to another device, for display via device 100 or an external display device, or the like.

Processing may continue at decision operation 311, "Last Image Frame of Video Sequence Processed?", where a determination may be made as to whether the current image frame is the last image frame of the video sequence. If so, process 300 may end at end operation 312. If not, process 300 may continue at operation 302 where another (e.g., subsequent) image frame of the video sequence may be obtained and processing may continue as discussed herein with respect to operations 303-310 for example.

As discussed, process 300 may be used to generate downscaled image data for a video sequence. Process 300 may be repeated any number of times for different images, image frames, video sequences, portions thereof, or the like. Furthermore, process 300 may be performed in serial for images or image frames, in parallel, or partially in parallel.

For example, the techniques discussed with respect to process 300 may provide for high image quality and low memory bandwidth implementations for image or video pipeline architectures as discussed herein.

FIG. 4 is a flow diagram illustrating an example process 400 for generating downscaled image data, arranged in accordance with at least some implementations of the present disclosure. Process 400 may include one or more operations 401-403 as illustrated in FIG. 4. Process 400 may form at least part of an image processing technique. By way of non-limiting example, process 400 may form at least part of a image processing technique performed by device 100 or device 200 as discussed herein. Furthermore, process 400 will be described herein with reference to system 500 of FIG. 5.

Figure 5:
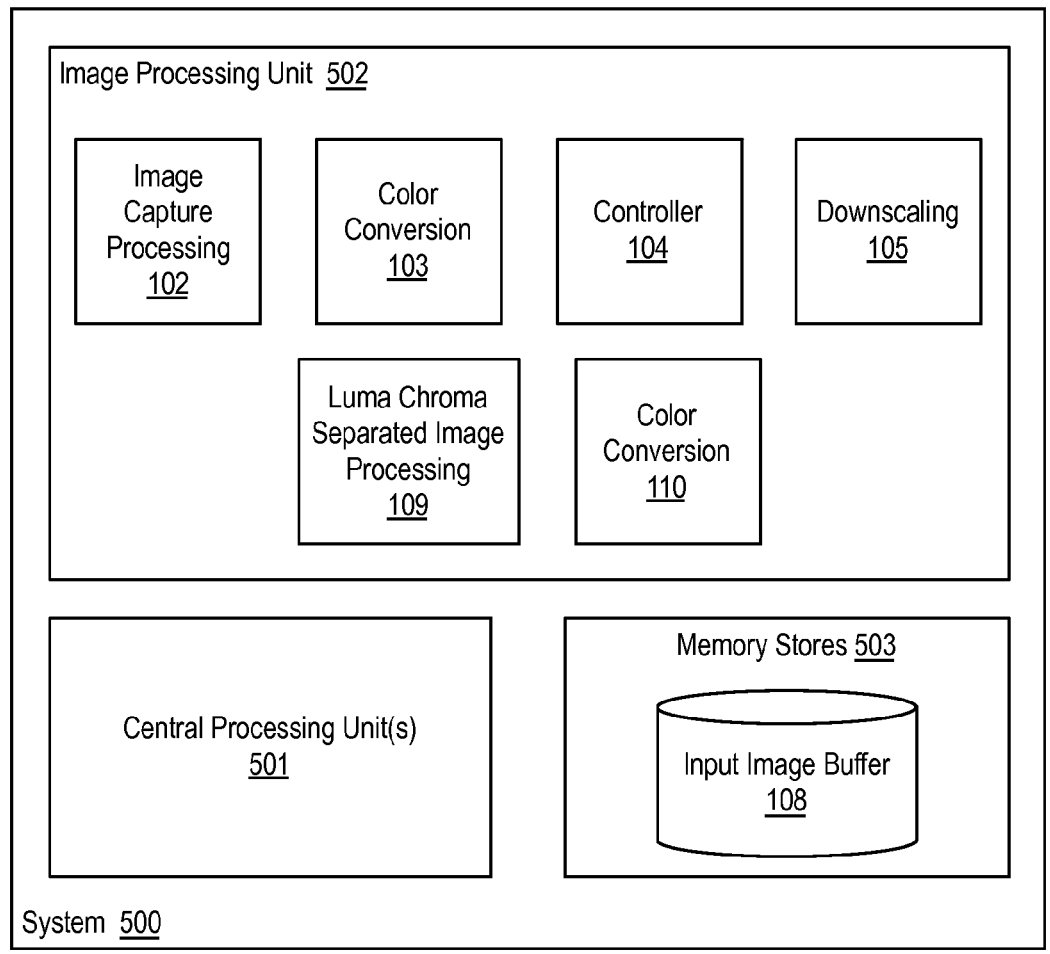
FIG. 5 is an illustrative diagram of an example system for generating downscaled image data.

FIG. 5 is an illustrative diagram of an example system 500 for generating downscaled image data, arranged in accordance with at least some implementations of the present disclosure. As shown in FIG. 5, system 500 may include one or more central processing units (CPU) 501, an image processing unit 502, and memory stores 503. Also as shown, image processing unit 502 may include image capture processing module 102, color conversion module 103, controller module 104, downscaling module 105, luma chroma separated image processing module 109, and color conversion module 109. Furthermore, memory stores 503 may include input image buffer 108. Such modules may be implemented to perform operations as discussed herein. In the example of system 500, memory stores 503 may include input image buffer 108 to store downscaled image data such as downscaled image data in a luma chroma separated color space and memory stores 503 may store image data or other associated data such as raw image data, input image data, luma chroma separated color space image data, downscaled image data, processed image data, linear color space image data, illumination indicators, adaptive color conversion coefficients or parameters, look up table data, sets of adaptive color conversion coefficients, or the like.

As shown, in some examples, image capture processing module 102, color conversion module 103, controller module 104, downscaling module 105, luma chroma separated image processing module 109, and color conversion module 109 may be implemented via image processing unit 502. In other examples, one or more or portions of image capture processing module 102, color conversion module 103, controller module 104, downscaling module 105, luma chroma separated image processing module 109, and color conversion module 109 may be implemented via central processing units 501 or a graphics processing unit. In yet other examples, one or more or portions of image capture processing module 102, color conversion module 103, controller module 104, downscaling module 105, luma chroma separated image processing module 109, and color conversion module 109 may be implemented via an imaging processing pipeline or unit.

Image processing unit 502 may include any number and type of graphics or image processing units that may provide the operations as discussed herein. In some examples, image processing unit may be an image signal processor. Such operations may be implemented via software or hardware or a combination thereof. For example, image processing unit 502 may include circuitry dedicated to manipulate image data obtained from memory stores 503. Central processing units 501 may include any number and type of processing units or modules that may provide control and other high level functions for system 500 and/or provide any operations as discussed herein. Memory stores 503 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 503 may be implemented by cache memory. In an embodiment, one or more or portions of image capture processing module 102, color conversion module 103, controller module 104, downscaling module 105, luma chroma separated image processing module 109, and color conversion module 109 may be implemented via an execution unit (EU) of image processing unit 502. The EU may include, for example, programmable logic or circuitry such as a logic core or cores that may provide a wide array of programmable logic functions. In an embodiment, one or more or portions of image capture processing module 102, color conversion module 103, controller module 104, downscaling module 105, luma chroma separated image processing module 109, and color conversion module 109 may be implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of image capture processing module 102, color conversion module 103, controller module 104, downscaling module 105, luma chroma separated image processing module 109, and color conversion module 109 may be implemented via an application specific integrated circuit (ASIC). The ASIC may include an integrated circuitry customized to perform the operations discussed herein.

Returning to discussion of FIG. 4, process 400 may begin at operation 401, "Determine Adaptive Color Conversion Coefficients for an Input Image Data based on an Illumination Indicator associated with the Input Image Data", where adaptive color conversion coefficients associated with input image data in a first color space may be determined based on an illumination indicator associated with the input image data. For example, the first color space may be a red-green-blue (RGB) color space or a red-green-blue-white (RGBW) color space as discussed herein. Furthermore, the illumination indicator may be a white balance parameter, a scene type parameter, or the like. In some examples, determining the adaptive color conversion coefficients based on the illumination indicator associated with the input image data may include accessing a look up table based on the illumination indicator. For example, controller module 104 as implemented via image processing unit 502 may determine the adaptive color conversion coefficients based on the illumination indicator associated with the input image data.

Furthermore, in some examples, the input image data may be generated based on receiving captured image data from an image sensor and performing image capture preprocessing based on the captured image data to generate the input image data. For example, the captured image data may be raw image data or the like from an image sensor and the image capture preprocessing may include demosaicing the captured image data, performing pixel defect correction based on the captured image data, performing shading correction based on the captured image data, or the like to generate full color image data (e.g., the input image data). For example, the captured image data may be captured via image sensor 101 or image sensor 201 or the like and the image capture preprocessing may be performed by image capture processing module 102 as implemented via image processing unit 502.

Processing may continue at operation 402, "Convert the Input Image Data to Color Converted Image Data in a Luma Chroma Separated Color Space based on the Adaptive Color Conversion Coefficients", where the input image data may be converted to color converted image data in a luma chroma separated color space based on the adaptive color conversion coefficients. For example, the put image data may be converted to color converted image data in the luma chroma separated color space via a linear conversion operation based on the adaptive color conversion coefficients. The luma chroma separated color space may be any suitable color space that separates luma and chroma channels (e.g., into a single luma channel and two or more chroma channels) and the luma chroma separated color space may be defined in a training or calibration phase or the like. For example, color conversion module 103 as implemented via image processing unit 502 may convert the input image data to color converted image data in the luma chroma separated color space based on the adaptive color conversion coefficients.

Processing may continue at operation 403, "Store Downscaled Color Converted Image Data associated with the Color Converted Image Data to an Input Image Buffer", where downscaled color converted image data associated with the color converted image data may be stored to an input image buffer. For example, the color converted image data may be downscaled via downscaling module 105 as implemented via image processing unit 502 to generate downscaled color converted image data. For example, chroma channels of the color converted image data may be downscaled in one or both of the horizontal and the vertical direction to generate the downscaled color converted image data. Furthermore the downscaled color converted image data may be stored to an input image buffer such as input image buffer 108 as implemented via memory stores 503.

Such a process may generate high image quality and low memory footprint image data in a luma chroma separated color space as discussed herein. Such image data may be accessed for further image processing. For example, the downscaled color converted image data may be retrieved from the input image buffer. One or more of denoising, sharpening, or chromatic alteration to generate processed image data may be performed based on the downscaled color converted image data to generate processed image data. Furthermore, the processed image data may be converted to a linear color space such as a linear red-green-blue (RGB) color space or the like. For example, luma chroma separated image processing module 109 as implemented via image processing unit 502 may the retrieve the downscaled color converted image data from the input image buffer and perform image processing on the downscaled color converted image data to generate the processed image data. Furthermore, color conversion module 110 as implemented via image processing unit 502 may color convert the processed image data to the linear color space.

Also, as discussed, in some examples, multiple image sensors and/or multiple image capture processing modules may be implemented. For example, second adaptive color conversion coefficients associated with second input image data may be determined based on a second illumination indicator associated with the second input image data. For example, the image data may be from a first image sensor (e.g., image sensor 101) and the second input image data may be from a second image sensor (e.g., image sensor 201). The second input image data may be converted to second color converted image data in the second color space (e.g., the luma chroma separated color space) based on the second adaptive color conversion coefficients. For example, color conversion module 103 as implemented via image processing unit 502 may convert the second input image data to the second color converted image data. For example, image capture processing module 102 as implemented via image processing unit 502 may generate the second illumination indicator or image capture processing module 202 may be implemented via image processing unit 502 to generate the second illumination indicator. Furthermore, the second downscaled color converted image data associated with the second color converted image data may be stored to the input image buffer (e.g., input image buffer 108 as implemented via memory stores 503).

Process 400 may be repeated any number of times either in series or in parallel for any number of input images or portions of input images. Process 400 may provide for high quality downscaled color converted image data. For example, process 400 may provide for high quality downscaled color converted image data for use by subsequent modules or stages of a video and/or image processing pipeline.

Various components of the systems described herein may be implemented in software, firmware, and/or hardware and/or any combination thereof. For example, various components of device 100, device 200, system 500, system 600, or device 700 may be provided, at least in part, by hardware of a computing System-on-a-Chip (SoC) such as may be found in a multi-function device or a computing system such as, for example, a laptop computer, a tablet, or a smart phone. Those skilled in the art may recognize that systems described herein may include additional components that have not been depicted in the corresponding figures. For example, the systems discussed herein may include additional components such as scanners (e.g., to perform optical scanning to generate scanned input images), printers (e.g., to translate an output image to paper or similar physical media), image pre-processing circuitry, or the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein.

The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of device 100, device 200, system 500, system 600, or device 700, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 6:
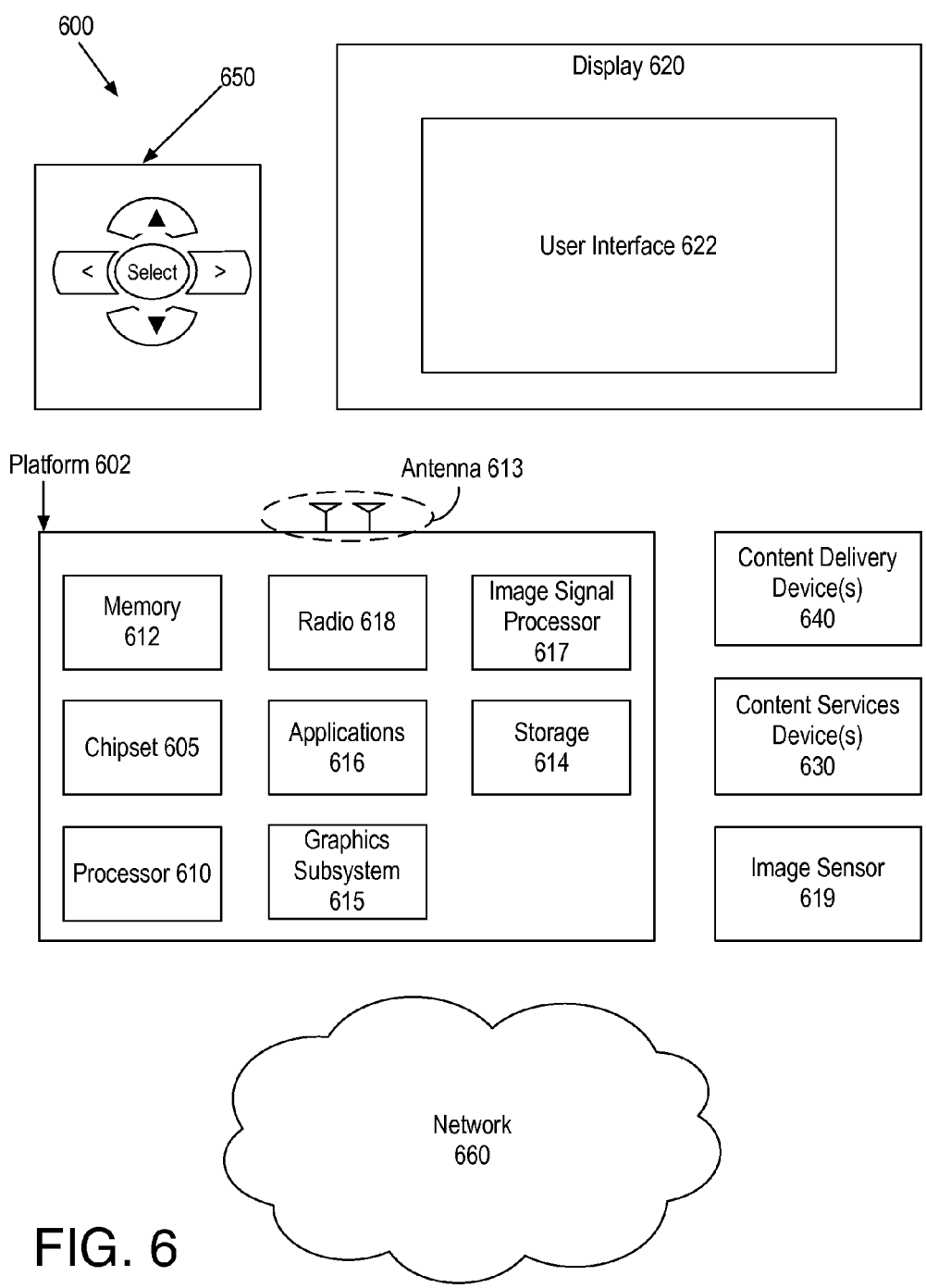
FIG. 6 is an illustrative diagram of an example system.

FIG. 6 is an illustrative diagram of an example system 600, arranged in accordance with at least some implementations of the present disclosure. In various implementations, system 600 may be a computing system although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), wearable device (e.g., smart watch or smart glasses), mobile internet device (MID), messaging device, data communication device, peripheral device, scanner, printer, multi-function device, and so forth.

In various implementations, system 600 includes a platform 602 coupled to a display 620. Platform 602 may receive content from a content device such as content services device(s) 630 or content delivery device(s) 640 or other content sources such as an image sensor 619. For example, platform 602 may receive raw image data from image sensor 619 or any other content source. A navigation controller 650 including one or more navigation features may be used to interact with, for example, platform 602 and/or display 620. Each of these components is described in greater detail below.

In various implementations, platform 602 may include any combination of a chipset 605, processor 610, memory 612, antenna 613, storage 614, graphics subsystem 615, applications 616, image signal processor 617 and/or radio 618. Chipset 605 may provide intercommunication among processor 610, memory 612, storage 614, graphics subsystem 615, applications 616, image signal processor 617 and/or radio 618. For example, chipset 605 may include a storage adapter (not depicted) capable of providing intercommunication with storage 614.

Processor 610 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 610 may be dual-core processor(s), dual-core mobile processor(s), and so forth.

Memory 612 may be implemented as a volatile memory device such as, but not limited to, a Random Access Memory (RAM), Dynamic Random Access Memory (DRAM), or Static RAM (SRAM).

Storage 614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 614 may include technology to increase the storage performance enhanced protection for valuable digital media when multiple hard drives are included, for example.

Image signal processor 617 may be implemented as a specialized digital signal processor or the like used for image processing. In some examples, image signal processor 617 may be implemented based on a single instruction multiple data or multiple instruction multiple data architecture or the like. In some examples, image signal processor 617 may be characterized as a media processor. As discussed herein, image signal processor 617 may be implemented based on a system on a chip architecture and/or based on a multi-core architecture.

Graphics subsystem 615 may perform processing of images such as still or video for display. Graphics subsystem 615 may be a graphics processing unit (GPU), a visual processing unit (VPU), or an image processing unit, for example. In some examples, graphics subsystem 615 may perform scanned image rendering as discussed herein. An analog or digital interface may be used to communicatively couple graphics subsystem 615 and display 620. For example, the interface may be any of a High-Definition Multimedia Interface, DisplayPort, wireless HDMI, and/or wireless HD compliant techniques. Graphics subsystem 615 may be integrated into processor 610 or chipset 605. In some implementations, graphics subsystem 615 may be a stand-alone device communicatively coupled to chipset 605.

The graphics and/or video processing techniques described herein may be implemented in various hardware architectures. For example, graphics and/or video functionality may be integrated within a chipset. Alternatively, a discrete graphics and/or image processor and/or application specific integrated circuit may be used. As still another implementation, the graphics and/or video functions may be provided by a general purpose processor, including a multi-core processor. In further embodiments, the functions may be implemented in a consumer electronics device.

Radio 618 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In various implementations, display 620 may include any flat panel monitor or display. Display 620 may include, for example, a computer display screen, touch screen display, video monitor, television-like device, and/or a television. Display 620 may be digital and/or analog. In various implementations, display 620 may be a holographic display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display user interface 622 on display 620.

In various implementations, content services device(s) 630 may be hosted by any national, international and/or independent service and thus accessible to platform 602 via the Internet, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620.

In various implementations, content services device(s) 630 may include a cable television box, personal computer, network, telephone, Internet enabled devices or appliance capable of delivering digital information and/or content, and any other similar device capable of uni-directionally or bi-directionally communicating content between content providers and platform 602 and/display 620, via network 660 or directly. It will be appreciated that the content may be communicated uni-directionally and/or bi-directionally to and from any one of the components in system 600 and a content provider via network 660. Examples of content may include any media information including, for example, video, music, medical and gaming information, and so forth.

Content services device(s) 630 may receive content such as cable television programming including media information, digital information, and/or other content. Examples of content providers may include any cable or satellite television or radio or Internet content providers. The provided examples are not meant to limit implementations in accordance with the present disclosure in any way.

Image sensor 619 may include any suitable image sensor that may provide raw image data based on a scene. For example, image sensor 619 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensor 619 may include any device that may detect information of a scene to generate raw image data. As discussed, in some examples, system 600 may include multiple image sensors, which may be the same or different. In some examples, image sensor 619 may provide image capture processing or logic associated with image sensor 619 (not shown) may provide such image capture processing. In other examples, the image capture processing discussed herein may be performed via platform 602.

In various implementations, platform 602 may receive control signals from navigation controller 650 having one or more navigation features. The navigation features of navigation controller 650 may be used to interact with user interface 622, for example. In various embodiments, navigation controller 650 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 650 may be replicated on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In various embodiments, navigation controller 650 may not be a separate component but may be integrated into platform 602 and/or display 620. The present disclosure, however, is not limited to the elements or in the context shown or described herein.

In various implementations, drivers (not shown) may include technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 even when the platform is turned "off." In addition, chipset 605 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the present disclosure.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
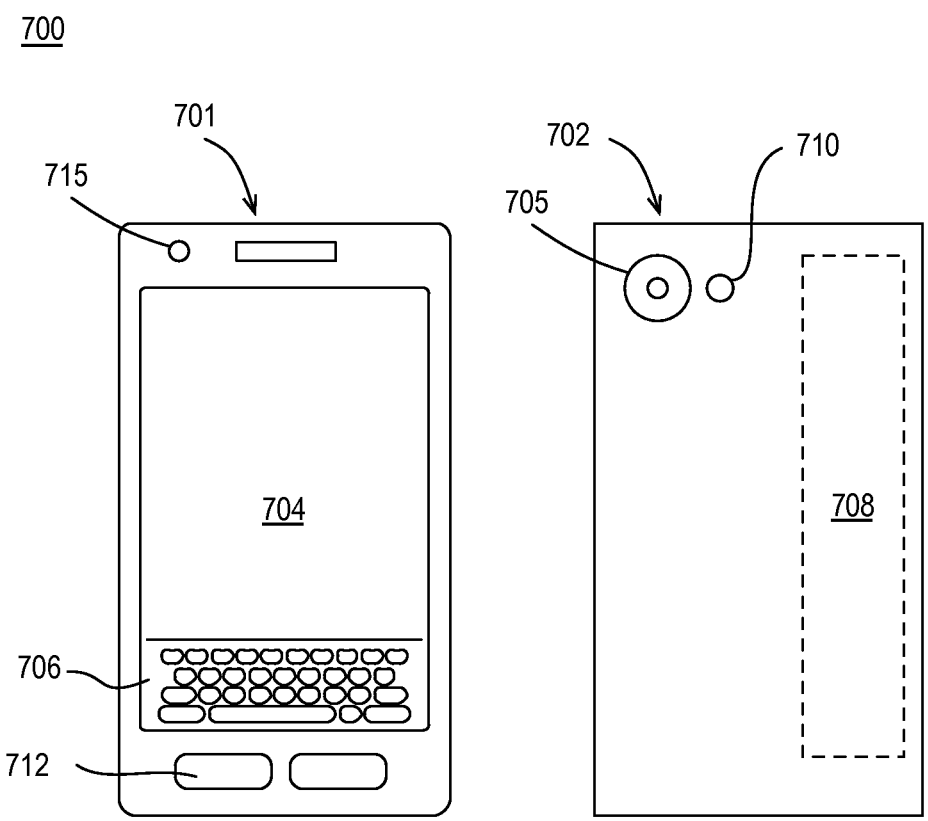
FIG. 7 illustrates an example small form factor device, all arranged in accordance with at least some implementations of the present disclosure.

As described above, system 600 may be embodied in varying physical styles or form factors. FIG. 7 illustrates an example small form factor device 700, arranged in accordance with at least some implementations of the present disclosure. In some examples, system 600 may be implemented via device 700. In other examples, device 100, device 200, system 500, or system 600, or portions thereof may be implemented via device 700. In various embodiments, for example, device 700 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may include a housing with a front 701 and a back 702. Device 700 includes a display 704, an input/output (I/O) device 706, and an integrated antenna 708. Device 700 also may include navigation features 712. I/O device 706 may include any suitable I/O device for entering information into a mobile computing device. Examples for I/O device 706 may include an alphanumeric keyboard, a numeric keypad, a touch pad, input keys, buttons, switches, microphones, speakers, voice recognition device and software, and so forth. Information also may be entered into device 700 by way of microphone (not shown), or may be digitized by a voice recognition device. As shown, device 700 may include a camera 705 (e.g., including a lens, an aperture, and an imaging sensor) and a flash 710 integrated into back 702 (or elsewhere) of device 700 and a camera 715 integrated into front 701 of device 700. Camera 705 and flash 710 and/or camera 715 may be components of a camera module to originate image data processed into streaming video that is output to display 704 and/or communicated remotely from device 700 via antenna 708 for example. For example, camera 705 may include image sensor 101 and camera 715 may include image sensor 102.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for generating downscaled image data comprises determining adaptive color conversion coefficients associated with input image data in a first color space based on an illumination indicator associated with the input image data, converting the input image data to color converted image data in a second color space based on the adaptive color conversion coefficients, wherein the second color space is a luma chroma separated color space, and storing downscaled color converted image data associated with the color converted image data to an input image buffer.

Further to the first embodiments, converting the input image data to the color converted image data comprises a linear conversion operation.

Further to the first embodiments, determining the adaptive color conversion coefficients comprises accessing a look up table based on the illumination indicator.

Further to the first embodiments, the method further comprises receiving captured image data from an image sensor and performing image capture preprocessing based on the captured image data to generate the input image data.

Further to the first embodiments, the method further comprises receiving captured image data from an image sensor and performing image capture preprocessing based on the captured image data to generate the input image data and the image capture preprocessing comprises at least one of demosaicing the captured image data, performing pixel defect correction based on the captured image data, or performing shading correction based on the captured image data.

Further to the first embodiments, the method further comprises receiving captured image data from an image sensor and performing image capture preprocessing based on the captured image data to generate the input image data, and/or wherein the image capture preprocessing comprises at least one of demosaicing the captured image data, performing pixel defect correction based on the captured image data, or performing shading correction based on the captured image data.

Further to the first embodiments, the method further comprises downscaling the color converted image data to generate the downscaled color converted image data, wherein the downscaling comprises at least one of a horizontal downscaling or a vertical downscaling of color channels of the color converted image data.

Further to the first embodiments, the first color space comprises at least one of a red-green-blue (RGB) color space or a red-green-blue-white (RGBW) color space.

Further to the first embodiments, the illumination indicator comprises at least one of a white balance parameter or a scene type parameter.

Further to the first embodiments, the first color space comprises at least one of a red-green-blue (RGB) color space or a red-green-blue-white (RGBW) color space and/or the illumination indicator comprises at least one of a white balance parameter or a scene type parameter.

Further to the first embodiments, the method further comprises retrieving the downscaled color converted image data from the input image buffer, performing, based on the downscaled color converted image data, at least one of denoising, sharpening, or chromatic alteration to generate processed image data, and converting the processed image data to a linear red-green-blue (RGB) color space.

Further to the first embodiments, the method further comprises determining second adaptive color conversion coefficients associated with second input image data based on a second illumination indicator associated with the second input image data, wherein the image data is from a first image sensor and the second input image data is from a second image sensor, converting the second input image data to second color converted image data in the second color space based on the second adaptive color conversion coefficients, and storing second downscaled color converted image data associated with the second color converted image data to the input image buffer.

In one or more second embodiments, a system for providing a video pipeline comprises a controller to determine adaptive color conversion coefficients associated with input image data in a first color space based on an illumination indicator associated with the input image data, a color conversion module to converting the input image data to color converted image data in a second color space based on the adaptive color conversion coefficients, wherein the second color space is a luma chroma separated color space, and an input image buffer to store downscaled color converted image data associated with the color converted image data.

Further to the second embodiments, the color conversion module to convert the input image data to the color converted image data comprises the color conversion module to perform a linear conversion operation.

Further to the second embodiments, the controller to determine the adaptive color conversion coefficients comprises the controller to access a look up table based on the illumination indicator.

Further to the second embodiments, the system further comprises an image sensor to capture image data associated with an image scene and an image capture preprocessing module to demosaic the captured image data, perform pixel defect correction based on the captured image data, or perform shading correction based on the captured image data image to generate the input image data.

Further to the second embodiments, the system further comprises a downscaling module to generate the downscaled color converted image data, wherein the downscaling module is to perform at least one of a horizontal downscaling or a vertical downscaling of color channels of the color converted image data.

Further to the second embodiments, the first color space comprises at least one of a red-green-blue (RGB) color space or a red-green-blue-white (RGBW) color space.

Further to the second embodiments, the illumination indicator comprises at least one of a white balance parameter or a scene type parameter.

Further to the second embodiments, the first color space comprises at least one of a red-green-blue (RGB) color space or a red-green-blue-white (RGBW) color space and the illumination indicator comprises at least one of a white balance parameter or a scene type parameter.

Further to the second embodiments, the system further comprises a luma chroma separated image processing module to receive the downscaled color converted image data from the input image buffer and to denoise, sharpen, or chromatically alter the downscaled color converted image data to generate processed image data.

Further to the second embodiments, the system further comprises a second color conversion module to convert the processed image data to a linear red-green-blue (RGB) color space.

Further to the second embodiments, the system further comprises a first image sensor to capture first image data associated with an image scene, a first captured image preprocessing module to generate the input image data, a second image sensor to capture second image data associated with a second image scene, a second captured image preprocessing module to generate second input image data, and the color conversion module is to convert the second input image data to second color converted image data in the second color space based on second adaptive color conversion coefficients and the input image buffer is to store second downscaled color converted image data associated with the second color converted image data.

In one or more third embodiments, a system for providing a video pipeline comprises means for determining adaptive color conversion coefficients associated with input image data in a first color space based on an illumination indicator associated with the input image data, means for converting the input image data to color converted image data in a second color space based on the adaptive color conversion coefficients, wherein the second color space is a luma chroma separated color space, and means for storing downscaled color converted image data associated with the color converted image data to an input image buffer.

Further to the third embodiments, the means for converting the input image data to the color converted image data comprise means for performing a linear conversion operation.

Further to the third embodiments, the means for determining the adaptive color conversion coefficients comprise means for accessing a look up table based on the illumination indicator.

Further to the third embodiments, the system further comprises an image sensor to capture image data associated with an image scene and means for performing image capture preprocessing based on the captured image data to generate the input image data.

Further to the third embodiments, the system further comprises an image sensor to capture image data associated with an image scene and means for performing image capture preprocessing based on the captured image data to generate the input image data, and the means for image capture preprocessing comprise at least one of means for demosaicing the captured image data, means for performing pixel defect correction based on the captured image data, or means for performing shading correction based on the captured image data.

Further to the third embodiments, the system further comprises means for downscaling the color converted image data to generate the downscaled color converted image data, wherein the means for downscaling comprise at least one of means for performing a horizontal downscaling or means for performing a vertical downscaling of color channels of the color converted image data.

Further to the third embodiments, the first color space comprises at least one of a red-green-blue (RGB) color space or a red-green-blue-white (RGBW) color space.

Further to the third embodiments, the illumination indicator comprises at least one of a white balance parameter or a scene type parameter.

Further to the third embodiments, the system further comprises means for retrieving the downscaled color converted image data from the input image buffer, means for performing, based on the downscaled color converted image data, at least one of denoising, sharpening, or chromatic alteration to generate processed image data, and means for converting the processed image data to a linear red-green-blue (RGB) color space.

Further to the third embodiments, the system further comprises means for determining second adaptive color conversion coefficients associated with second input image data based on a second illumination indicator associated with the second input image data, wherein the image data is from a first image sensor and the second input image data is from a second image sensor, means for converting the second input image data to second color converted image data in the second color space based on the second adaptive color conversion coefficients, and means for storing second downscaled color converted image data associated with the second color converted image data to the input image buffer.

In one or more fourth embodiments, at least one machine readable medium comprises a plurality of instructions that, in response to being executed on a device, cause the device to generate downscaled image data by determining adaptive color conversion coefficients associated with input image data in a first color space based on an illumination indicator associated with the input image data, converting the input image data to color converted image data in a second color space based on the adaptive color conversion coefficients, wherein the second color space is a luma chroma separated color space, and storing downscaled color converted image data associated with the color converted image data to an input image buffer.

Further to the fourth embodiments, converting the input image data to the color converted image data comprises a linear conversion operation and generating the adaptive color conversion coefficients comprises accessing a look up table based on the illumination indicator.

Further to the fourth embodiments, the machine readable medium further comprises a instructions that, in response to being executed on the device, cause the device to generate downscaled image data by receiving captured image data from an image sensor and performing image capture preprocessing based on the captured image data to generate the input image data Further to the fourth embodiments, the machine readable medium further comprises a instructions that, in response to being executed on the device, cause the device to generate downscaled image data by downscaling the color converted image data to generate the downscaled color converted image data, wherein the downscaling comprises at least one of a horizontal downscaling or a vertical downscaling of color channels of the color converted image data.

Further to the fourth embodiments, the first color space comprises at least one of a red-green-blue (RGB) color space or a red-green-blue-white (RGBW) color space and the illumination indicator comprises at least one of a white balance parameter or a scene type parameter.

Further to the fourth embodiments, the machine readable medium further comprises a instructions that, in response to being executed on the device, cause the device to generate downscaled image data by retrieving the downscaled color converted image data from the input image buffer, performing, based on the downscaled color converted image data, at least one of denoising, sharpening, or chromatic alteration to generate processed image data, and converting the processed image data to a linear red-green-blue (RGB) color space.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A method for generating downscaled image data comprising:
   determining adaptive color conversion coefficients associated with input image data in a first color space based on an illumination indicator associated with the input image data, wherein the adaptive color conversion coefficients are to convert the input image data from the first color space to a second color space, and wherein the second color space is a luma chroma separated color space;

applying the adaptive color conversion coefficients to the input image by a linear conversation operation on the input image to convert the input image data to color converted image data in the second color space downscaling the color converted image data to generate downscaled color converted image data, wherein the downscaling comprises at least one of a horizontal downscaling or a vertical downscaling of color channels of the color converted image data; and storing the downscaled color converted image data associated with the color converted image data to an input image buffer.

2. The method of claim 1, further comprising:
receiving a user input indicating an image capture mode; and
determining the illumination indicator based on the received user input indicating the image capture mode.

3. The method of claim 1, wherein determining the adaptive color conversion coefficients comprises accessing a look up table based on the illumination indicator.

4. The method of claim 1, further comprising:
receiving captured image data from an image sensor; and
performing image capture preprocessing based on the captured image data to generate the input image data.

5. The method of claim 4, wherein the image capture preprocessing comprises at least one of demosaicing the captured image data, performing pixel defect correction based on the captured image data, or performing shading correction based on the captured image data.

6. The method of claim 1, wherein the illumination indicator comprises a scene type parameter.

7. The method of claim 1, wherein the first color space comprises at least one of a red-green-blue (RGB) color space or a red-green-blue-white (RGBW) color space.

8. The method of claim 1, wherein the illumination indicator comprises a white balance parameter.

9. The method of claim 1, further comprising:
retrieving the downscaled color converted image data from the input image buffer;
performing, based on the downscaled color converted image data, denoising, sharpening, and chromatic alteration to generate processed image data; and
converting the processed image data to a linear red-green-blue (RGB) color space.

10. The method of claim 1, further comprising:
determining second adaptive color conversion coefficients associated with second input image data based on a second illumination indicator associated with the second input image data, wherein the image data is from a first image sensor and the second input image data is from a second image sensor;
converting the second input image data to second color converted image data in the second color space based on the second adaptive color conversion coefficients; and
storing second downscaled color converted image data associated with the second color converted image data to the input image buffer.

11. A system for providing a video pipeline comprising:
a controller to determine adaptive color conversion coefficients associated with input image data in a first color space based on an illumination indicator associated with the input image data, wherein the adaptive color conversion coefficients are to convert the input image data from the first color space to a second color space, and wherein the second color space is a luma chroma separated color space;

an image processing unit to apply the adaptive color conversion coefficients to the input image by a linear conversation operation on the input image to convert the input image data to color converted image data in the second color space and to downscale the color converted image data to generate downscaled color converted image data, wherein the downscaling comprises at least one of a horizontal downscaling or a vertical downscaling of color channels of the color converted image data; and an input image buffer to store the downscaled color converted image data associated with the color converted image data.

12. The system of claim 11, further comprising:
an image sensor to capture image data associated with an image scene, wherein the image processing unit is to demosaic the captured image data, perform pixel defect correction based on the captured image data, or perform shading correction based on the captured image data image to generate the input image data.

13. The system of claim 11, wherein the image processing unit is to receive a user input indicating an image capture mode and determine the illumination indicator based on the received user input indicating the image capture mode.

14. The system of claim 11, further comprising:
a central processing unit to receive the downscaled color converted image data from the input image buffer and to denoise, sharpen, and chromatically alter the downscaled color converted image data to generate processed image data.

15. The system of claim 14, wherein the central processing unit is to convert the processed image data to a linear red-green-blue (RGB) color space.

16. The system of claim 11, further comprising:
a first image sensor to capture first image data associated with an image scene, wherein the image processing unit is to generate the input image data;
a second image sensor to capture second image data associated with a second image scene, wherein the image processing unit is to generate second input image data and to convert the second input image data to second color converted image data in the second color space based on second adaptive color conversion coefficients, and wherein the input image buffer is to store second downscaled color converted image data associated with the second color converted image data.

17. The system of claim 11, wherein the first color space comprises at least one of a red-green-blue (RGB) color space or a red-green-blue-white (RGBW) color space and the illumination indicator comprises at least one of a white balance parameter or a scene type parameter.

18. At least one non-transitory machine readable medium comprising plurality of instructions that, in response to being executed on a device, cause the device to generate downscaled image data by:
determining adaptive color conversion coefficients associated with input image data in a first color space based on an illumination indicator associated with the input image data, wherein the adaptive color conversion coefficients are to convert the input image data from the first color space to a second color space, and wherein the second color space is a luma chroma separated color space;

applying the adaptive color conversion coefficients to the input image by a linear conversation operation on the input image to convert the input image data to color converted image data in the second color space downscaling the color converted image data to generate downscaled color converted image data, wherein the downscaling comprises at least one of a horizontal downscaling or a vertical downscaling of color channels of the color converted image data; and storing the downscaled color converted image data associated with the color converted image data to an input image buffer.

19. The machine readable medium of claim 18, wherein determining the adaptive color conversion coefficients comprises accessing a look up table based on the illumination indicator.

20. The machine readable medium of claim 18 further comprising instructions that, in response to being executed on the device, cause the device to generate downscaled image data by:

receiving captured image data from an image sensor; and performing image capture preprocessing based on the captured image data to generate the input image data.

21. The machine readable medium of claim 18 further comprising instructions that, in response to being executed on the device, cause the device to generate downscaled image data by:

receiving a user input indicating an image capture mode; and determining the illumination indicator based on the received user input indicating the image capture mode.

22. The machine readable medium of claim 18, wherein the first color space comprises at least one of a red-green-blue (RGB) color space or a red-green-blue-white (RGBW) color space and the illumination indicator comprises at least one of a white balance parameter or a scene type parameter.

23. The machine readable medium of claim 18 further comprising instructions that, in response to being executed on the device, cause the device to generate downscaled image data by:

retrieving the downscaled color converted image data from the input image buffer;

performing, based on the downscaled color converted image data, denoising, sharpening, and chromatic alteration to generate processed image data; and converting the processed image data to a linear red-green-blue (RGB) color space.

\* \* \* \* \*